US 8,521,228 B2

(12) United States Patent
Choi

(10) Patent No.: US 8,521,228 B2
(45) Date of Patent: Aug. 27, 2013

(54) MOBILE TERMINAL AND METHOD OF DISPLAYING STANDBY SCREEN THEREOF

(75) Inventor: Kyung-Dong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 794 days.

(21) Appl. No.: 11/948,831

(22) Filed: Nov. 30, 2007

(65) Prior Publication Data

US 2008/0132287 A1 Jun. 5, 2008

(30) Foreign Application Priority Data

Dec. 1, 2006 (KR) ........................ 10-2006-0120899

(51) Int. Cl.
*H04M 1/00* (2006.01)
*H04M 3/42* (2006.01)
*G06F 15/173* (2006.01)

(52) U.S. Cl.
USPC .......................... 455/566; 455/414.1; 709/223

(58) Field of Classification Search
USPC .............. 455/566, 414.1; 709/223; 348/729
See application file for complete search history.

(56) References Cited

U.S. PATENT DOCUMENTS

| 7,251,504 B2 * | 7/2007 | Lee et al. | 455/566 |
| 7,748,017 B2 * | 6/2010 | Kiiskinen | 725/46 |
| 2004/0077340 A1 * | 4/2004 | Forsyth | 455/414.1 |
| 2006/0030370 A1 * | 2/2006 | Wardimon | 455/566 |
| 2006/0095936 A1 * | 5/2006 | Kim | 725/39 |
| 2006/0143651 A1 * | 6/2006 | Kim | 725/39 |
| 2007/0033620 A1 * | 2/2007 | Kim et al. | 725/62 |
| 2007/0109445 A1 * | 5/2007 | Lee | 348/559 |
| 2008/0062656 A1 * | 3/2008 | Kim | 361/747 |

FOREIGN PATENT DOCUMENTS

| CN | 1770844 | 5/2006 |
| CN | 1822649 | 8/2006 |
| KR | 1020030087525 | 11/2003 |
| KR | 1020050044844 | 5/2005 |
| WO | WO 2005112491 A1 * | 11/2005 |

* cited by examiner

*Primary Examiner* — Kent Chang
*Assistant Examiner* — Scott Au
(74) *Attorney, Agent, or Firm* — Lee, Hong, Degerman, Kang & Waimey

(57) ABSTRACT

A standby mode screen display method for a mobile terminal capable of receiving and displaying a multimedia broadcast program and a mobile terminal thereof, includes a broadcast receiving module for receiving a multimedia broadcast program, a user input unit for inputting at least one search identifier associated with searching multimedia broadcast programs and a display mode identifier, a controller for comparing the search identifier with program guide information associated with multimedia broadcast programs to find a matching multimedia broadcast program received wirelessly from a remote location, and a display unit for displaying, as a standby mode screen, the matching multimedia broadcast program on the mobile terminal in accordance with the display mode identifier.

12 Claims, 12 Drawing Sheets

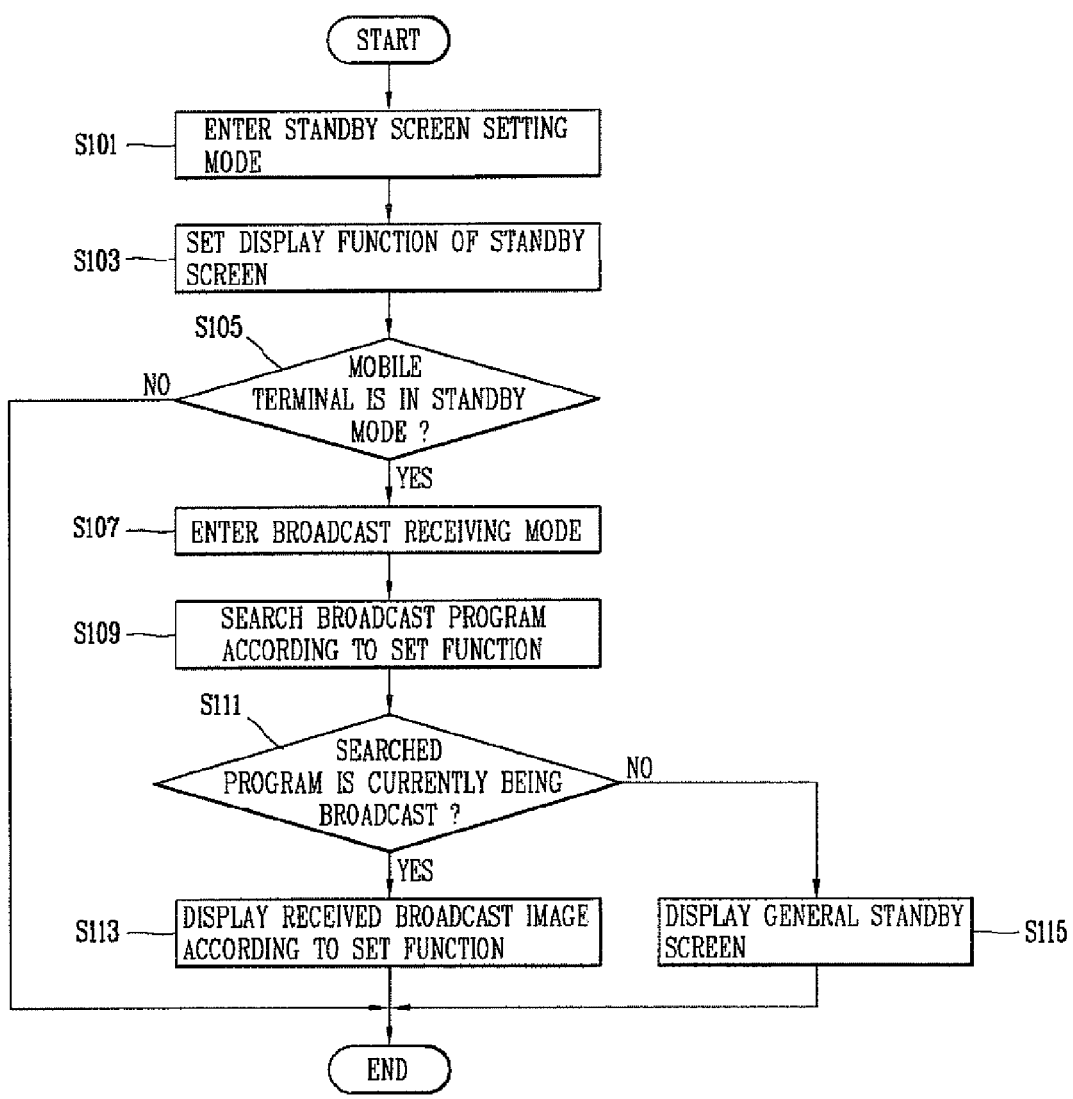

MOBILE TERMINAL AND METHOD OF DISPLAYING STANDBY SCREEN THEREOF

CROSS-REFERENCE TO RELATED APPLICATION

Pursuant to 35 U.S.C. § 119(a), this non-provisional patent application claims the benefit of the earlier filing date and right of priority of Patent Application No. 10-2006-0120899 filed in Republic of Korea on Dec. 1, 2006, the entire contents of which are hereby incorporated by reference.

FIELD OF THE INVENTION

The present invention relates to a mobile terminal, and more particularly, to a mobile terminal and a method of displaying a broadcast image on a standby screen.

DISCUSSION OF THE RELATED ART

A mobile terminal is a device which may be configured to perform various functions. For example, such functions may include data and voice communications, capturing images and video via a camera, recording audio, playing music files via a speaker system, and displaying images and video on a display. Some mobile terminals include additional functions which support playing games, while other terminals are configured as multimedia players. More recently, mobile terminals have been configured to receive broadcast and multicast signals which permit viewing video and television program content.

Efforts are ongoing to support and increase the functionality of mobile terminals. Such efforts include software and hardware improvements, as well as changes and improvements in the structural components which form the mobile terminal.

SUMMARY OF THE INVENTION

In accordance with an embodiment of the present invention, a standby mode screen display method for a mobile terminal capable of receiving and displaying a multimedia broadcast program includes detecting in a screen selection mode at least one search identifier associated with searching multimedia broadcast programs and a display mode identifier, comparing the search identifier with program guide information associated with multimedia broadcast programs to find a matching multimedia broadcast program received wirelessly from a remote location, and displaying, as a standby mode screen, the matching multimedia broadcast program on the mobile terminal in accordance with the display mode identifier.

It is contemplated that the at least one search identifier comprises at least one of channel, program title, search word, and broadcast time. It is further contemplated that the program guide information comprises electronic program guide broadcast with the multimedia broadcast programs.

It is contemplated that the display mode identifier is configured to display the matching multimedia broadcast program in at least one of still and moving images. It is further contemplated that the display mode identifier comprises displaying at least one still image that is periodically updated. Additionally, it is contemplated that when the display mode identifier comprises displaying moving images as the standby mode screen, then the moving image is displayed without sound.

It is contemplated that the standby mode screen display method further includes selecting a presently viewing multimedia broadcast program as the standby mode screen through a menu option. It is further contemplated that the step of displaying the matching multimedia broadcast program further comprises displaying at least part of the program guide information corresponding to the matching multimedia broadcast program.

It is contemplated that the standby mode screen display method further includes displaying in the standby mode screen an indicator representing that the standby mode screen is set to display the matching multimedia broadcast program.

In another embodiment of the present invention a mobile terminal includes a broadcast receiving module configured to receive a multimedia broadcast program, a user input unit configured to receive user input, wherein the user input comprises at least one search identifier associated with searching multimedia broadcast programs and a display mode identifier, a controller configured to compare the search identifier with program guide information associated with multimedia broadcast programs to find a matching multimedia broadcast program received wirelessly from a remote location, and a display configured to display, as a standby mode screen, the matching multimedia broadcast program in accordance with the display mode identifier.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 5 is a flowchart illustrating a method of displaying a standby screen of a mobile terminal according to an embodiment of the present invention.

DETAILED DESCRIPTION OF PREFERRED EMBODIMENTS

In the following detailed description reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
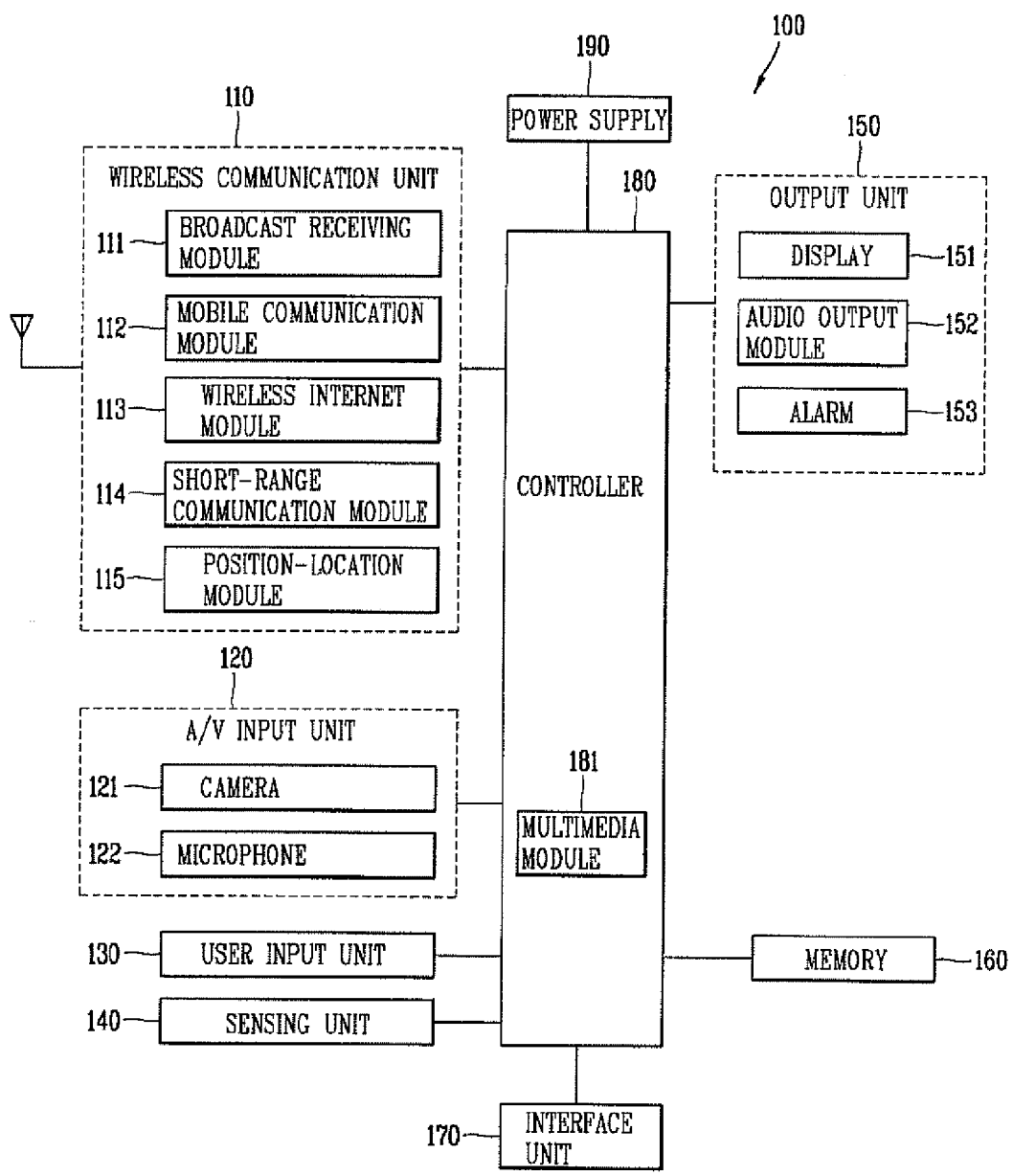
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be provided with regard to a mobile terminal. However, such teachings apply equally to other types of terminals. FIG. 1 shows the mobile terminal 100 having various components, but it is understood that implementing all of the illustrated components is not a requirement. Alternatively, more components may be implemented.

FIG. 1 illustrates a wireless communication unit 110 configured with several commonly implemented components. As illustrated, the wireless communication unit 110 typically includes one or more components which permit wireless communication between the mobile terminal 100 and a wireless communication system or network within which the mobile terminal is located.

The broadcast receiving module 111 may receive both a broadcast signal and associated broadcast information from an external broadcast managing entity via a broadcast channel. The broadcast channel may include a satellite channel and a terrestrial channel. The broadcast managing entity refers generally to a system which transmits broadcast signals and associated broadcast information. Examples of associated broadcast information include information associated with a broadcast channel, a broadcast program, and a broadcast service provider. Specifically, associated broadcast information may include an electronic program guide (EPG) of digital multimedia broadcasting (DMB), and electronic service guide (ESG) of digital video broadcast-handheld (DVB-H).

The broadcast signal may be implemented as one of a TV broadcast signal, a radio broadcast signal, and a data broadcast signal. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), DVB-H, the data broadcasting system known as media forward link only (MediaFLO®) and integrated services digital broadcast-terrestrial (ISDB-T). It is also possible to receive multicast signals. The data received by the broadcast receiving module 111 may be stored in a memory 160.

The mobile communication module 112 transmits and receives wireless signals to/from one or more network entities. The signals may represent audio, video, multimedia, control signaling, and data.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well as networking technologies commonly referred to as Bluetooth and ZigBee.

Position-location module 115 identifies or obtains the location of the mobile terminal. This module may be implemented using global positioning system (GPS) components which cooperate with associated satellites, network components, and combinations thereof.

The Audio/video (A/V) input unit 120 is configured to provide audio or video signal input to the mobile terminal. As illustrated in FIG. 1, the A/V input unit 120 includes a camera 121 and a microphone 122. The camera receives and processes image frames of still pictures or video.

The microphone 122 receives an external audio signal while the portable device is in one of a phone call mode, recording mode or voice recognition mode. This audio signal is processed and converted into digital data. The A/V input unit 120 typically includes assorted noise removing algorithms to remove noise generated in the course of receiving the external audio signal. Data generated by the A/V input unit 120 may be stored in memory 160, utilized by output unit 150, or transmitted via one or more modules of the communication unit 110. If desired, two or more microphones or cameras may be used.

The user input unit 130 generates input data responsive to user manipulation of an associated input device or devices. Input devices may include a keypad, a dome switch, a touchpad, e.g., static pressure/capacitance, a jog wheel and a jog switch. The user input unit 130 may be configured as a touchpad in cooperation with a touch screen display, as described in more detail below.

The sensing unit 140 provides status measurements of various aspects of the mobile terminal. For example, the sensing unit may detect an open/close status of the mobile terminal, relative positioning of display and keypad components of the mobile terminal, a change of position of the mobile terminal or a component of the mobile terminal, a presence or absence of user contact with the mobile terminal, and orientation or acceleration/deceleration of the mobile terminal.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is configured to couple the mobile terminal with external devices. Typical external devices include wired and wireless headphones, external chargers, power supplies, storage devices configured to store audio, video, pictures and data, earphones, and microphones, among others. The interface unit 170 may be configured using a wired and wireless data port, a card socket for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For example, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, a liquid crystal display (LCD), a thin film transistor-liquid crystal display (TFT-LCD), an organic light-emitting diode display (OLED), a flexible display and a three-dimensional display. The mobile terminal may include one or more displays. An example of a two-display embodiment is one in which one display is configured as an internal display, viewable when the terminal is in an opened position. A second display may be configured as an external display, viewable in both the open and closed positions.

FIG. 1 further illustrates output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function, e.g., call received, message received, and errors.

The output unit 150 is further illustrated having an alarm 153, which is commonly used to signal or otherwise identify the occurrence of a particular event associated with the mobile terminal. Typical events include call received, message received and user input received. An example of such output includes providing vibrating tactile sensations to a user. The alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or the output may be performed using any combination of the components.

The memory 160 is generally used to store various types of data to support the processing, control, and storage requirements of the mobile terminal. Examples of such data include program instructions for applications operating on the mobile terminal, contact data, phonebook data, messages, pictures and video. The memory 160 illustrated in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. The controller performs the control and processing associated with voice calls, data communications, video calls, camera operations and recording operations. If desired, the controller may include a multimedia module 181 which provides multimedia playback. The multimedia module 181 may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination of both. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory 160, and executed by a controller or processor 180.

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
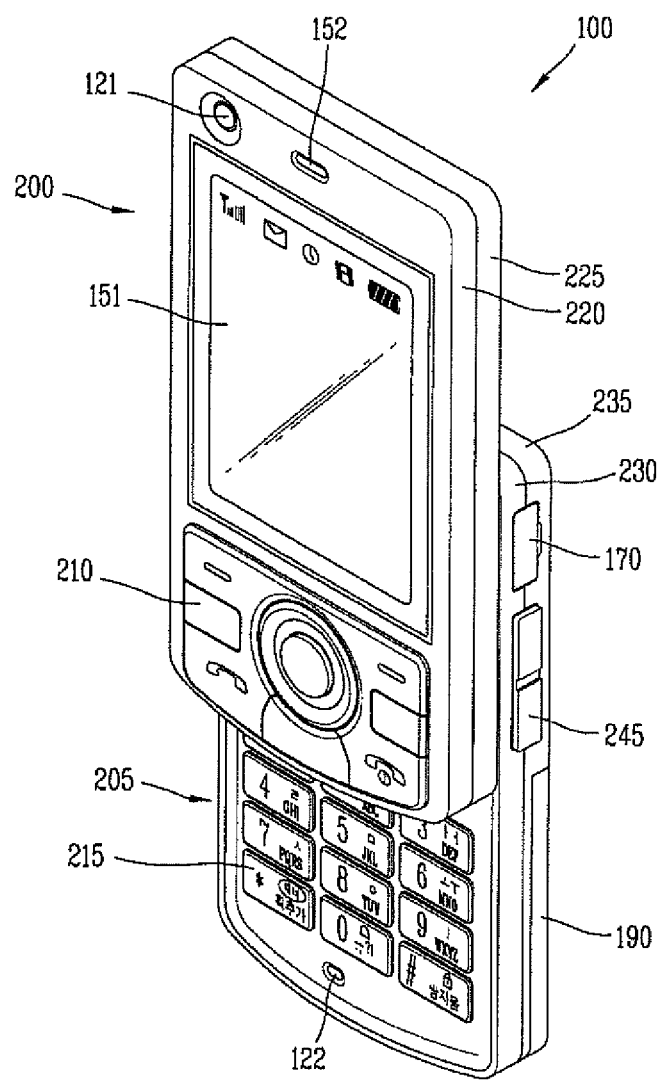
FIG. 2 illustrates a perspective view of a front side of a mobile terminal according to an embodiment of the present invention.

FIG. 2 illustrates a perspective view of a front side of a mobile terminal according to an embodiment of the present invention. In FIG. 2, the mobile terminal 100 is shown having a first body 200 configured to slideably couple with a second body 205. The user input unit 130, described in FIG. 1, is implemented using function keys 210 and keypad 215. The function keys 210 are associated with the first body 200, and the keypad 215 is associated with the second body 205. The keypad includes various number, character, and symbol keys to enable a user to place a call, prepare a text or multimedia message, and otherwise operate the mobile terminal.

The first body 200 slides relative to second body 205 between open and closed positions. In a closed position, the first body is positioned over the second body in a manner that the keypad 215 is substantially or completely obscured by the first body 200. In the open position, user access to the keypad 215, as well as the display 151 and function keys 210, is possible. The function keys are convenient for user input commands such as start, stop and scroll.

The mobile terminal 100 is operable in either a standby mode able to receive a call or message, receive and respond to network control signaling, or an active call mode. Typically, the mobile terminal 100 functions in a standby mode when in the closed position, and an active mode when in the open position. This mode configuration may be changed as required or desired by the user.

The first body 200 is formed from a first body first case 220 and a first body second case 225. The second body 205 is formed from a second body first case 230 and a second body second case 235. The first and second cases are usually formed from a suitably ridge material, such as injection molded plastic. However, the cases may be formed using metallic material, such as stainless steel (STS) and titanium (Ti).

One or more intermediate cases may be provided between the respective first and second cases of the first and second bodies 200, 205. The first and second bodies 200, 205 are typically sized to receive electronic components necessary to support operation of the mobile terminal 100.

The first body 200 has a camera 121 and audio output unit 152, which is configured as a speaker, both positioned relative to the display 151. Alternatively, the camera 121 may be configured in a rotation or swivel manner to be selectively positioned relative to the first body 200.

The function keys 210 are positioned adjacent to a lower side of the display 151. The display 151 is may be implemented as an LCD or OLED. As described above, the display may also be configured as a touch screen having an underlying touchpad which generates signals responsive to user finger or stylus contact with the touch screen.

The second body 205 is illustrated having a microphone 122 positioned adjacent to keypad 215, and side keys 245 positioned along the side of second body 205. Preferably, the side keys 245, which provide one type of user input, may be configured as hot keys, such that the side keys 245 are associated with a particular function of the mobile terminal 100. An interface unit 170 is positioned adjacent to the side keys 245. A power supply 190 configured as a battery is located on a lower portion of the second body 205.

Figure 3:
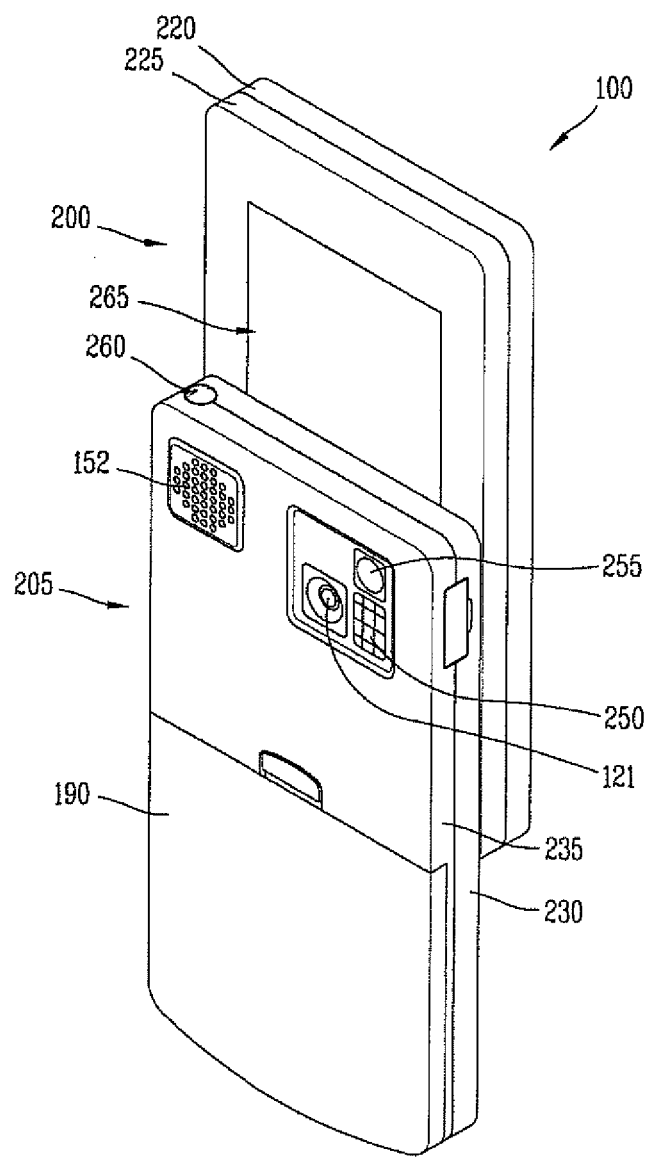
FIG. 3 illustrates a rear view of the mobile terminal shown in FIG. 2.

FIG. 3 illustrates a rear view of the mobile terminal illustrated in FIG. 2. FIG. 3 shows the second body 205 having a camera 121, and an associated flash 250 and mirror 255. The flash operates in conjunction with the camera 121 of the second body 205. The mirror 255 is used for positioning the camera 121 in a user self-portrait mode. The camera 121 of the second body 205 faces a direction which is opposite to a direction faced by camera 121 of the first body 200 (FIG. 2). Each of the cameras 121 of the first and second bodies may have the same or different capabilities.

In an embodiment of the present invention, the camera 121 of the first body 200 operates with a relatively lower resolution than the camera 121 of the second body 205. The arrangement works well during a video conference, for example, in which reverse link bandwidth capabilities may be limited. The relatively higher resolution of camera 121 of the second body 205 (FIG. 3) is useful for obtaining higher quality pictures for later use.

The second body 205 also includes an audio output module 152 configured as a speaker, and which is located on an upper side of the second body. The audio output modules 152 of the first and second bodies 200 and 205 may provide stereo output. Moreover, one or both of these audio output modules 152 may be configured to operate as a speakerphone.

A broadcast signal receiving antenna 260 is disposed at an upper end of the second body 205. Antenna 260 functions in cooperation with the broadcast receiving module 111 (FIG. 1). The antenna 260 may be fixed or configured to retract into the second body 205.

The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

Figure 4:
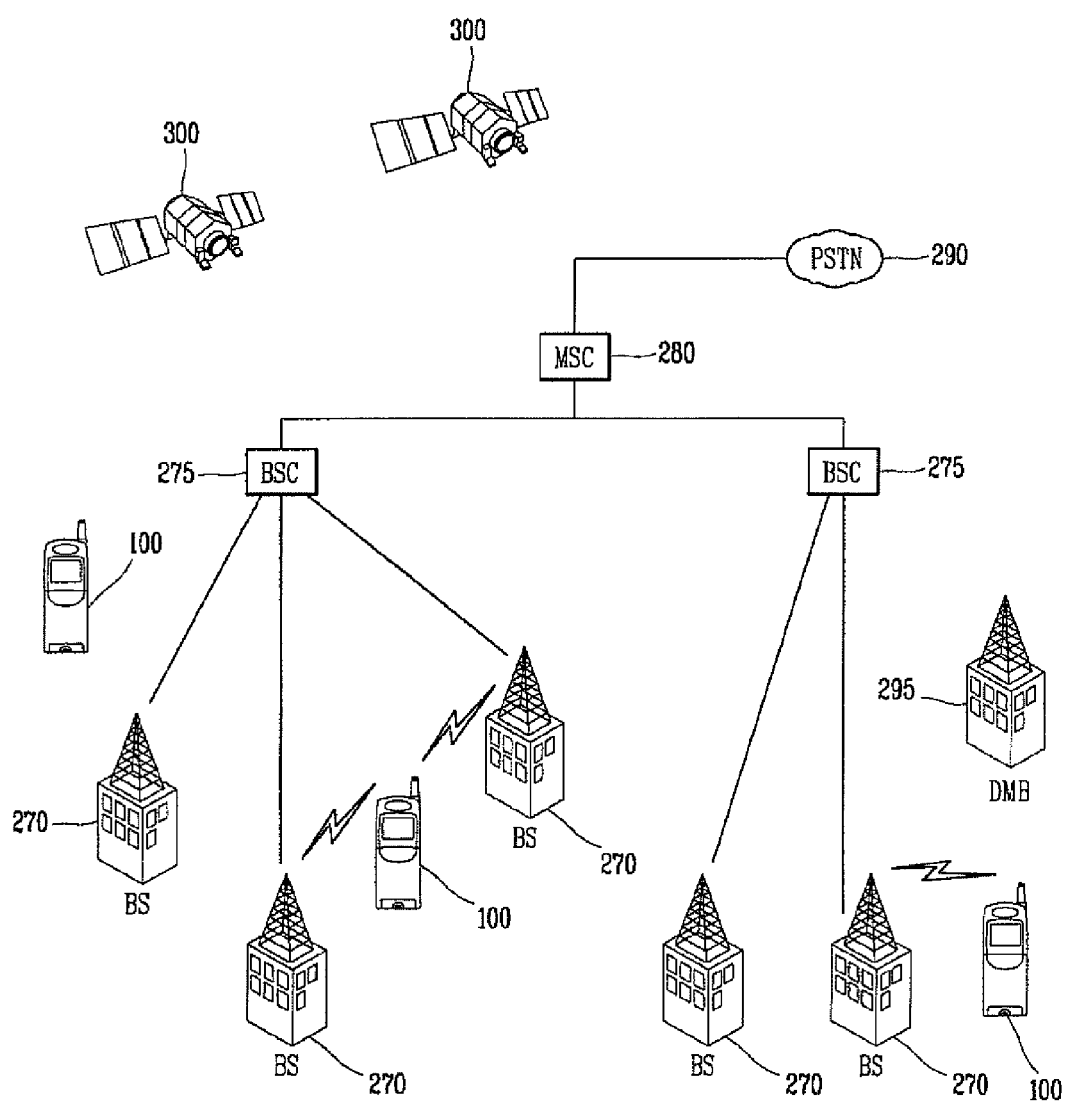
FIG. 4 illustrates a block diagram of a CDMA wireless communication system operable with the mobile terminal of FIGS. 1-3.

The mobile terminal 100 of FIGS. 1 to 3 may be configured to operate within a communication system which transmits data via frames or packets, including both wireless and wireline communication systems, and satellite-based communication systems (FIG. 4). The communication systems may utilize different air interfaces and physical layers.

Examples of air interfaces utilized by the communication systems include frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omni-directional antenna or an antenna pointed in a particular radial direction away from the base station 270. Alternatively, each sector may include two antennas for diversity reception. Each base station 270 may be configured to support a plurality of frequency assignments, with each frequency assignment having a particular spectrum, e.g., 1.25 MHz or 5 MHz.

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling, as described above.

FIG. 4 further depicts several global positioning system (GPS) satellites 300. Such satellites facilitate locating the position of some or all of the portable terminals 100. Two satellites are depicted, but it is understood that useful positioning information may be obtained with more or less satellites. The position-location module 115 (FIG. 1) of the portable terminal 100 is typically configured to communicate with the satellites 300 to obtain desired position information. Those skilled in the art will appreciated that other types of position detection technology, including location technology that may be used in addition to or instead of GPS location technology, may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN 290 interfaces with the MSC 280, and the MSC interfaces with the BSCs 275, which in turn control the base stations 270 to transmit sets of forward-link signals to the mobile terminals 100.

A configuration of a mobile terminal 100 for displaying a broadcast image on a standby screen according to an embodiment of the present invention will be explained in more detail with reference to FIGS. 1 to 3.

The broadcast receiving module 111 receives a broadcast signal to be displayed on a standby screen. The broadcast receiving module 111 may include a tuner for receiving a broadcast signal of a specific channel transmitted through a satellite or a base station, a demodulation unit for demodulating a received broadcast signal, and a decoder for decoding the demodulated broadcast signal. The demodulated broadcast signal is decoded for an image signal and an audio signal.

The mobile communication module 112 may be implemented as a receiving unit for receiving a wireless signal from outside through an antenna (ANT) and demodulating the signal, and a transmitting unit for transmitting data outwardly after converting into a wireless signal. The wireless signal may include audio data, video data, and text data.

The user input unit 130 serves to input information for setting a display function of a standby screen by a user. The user input unit 130 has a setting key for setting a broadcast image to be displayed on the standby screen. Also, the user input unit 130 has a function key for implementing a broadcast viewing mode by a user's request while a broadcast image is displayed on the standby screen of the mobile terminal 100.

When the current mode of the mobile terminal 100 is converted into a standby mode, the display 151 displays a broadcast image received through the broadcast receiving module 111 on the standby screen under control of the controller 180. The display 151 displays a broadcast signal being currently broadcast rather than a general standby screen according to a display function of the standby screen set by a user. Furthermore, the display 151 displays an indicator or an icon for indicating an activated or non-activated status of the display function of the standby screen.

The audio output module 152 converts an audio signal decoded by the broadcast receiving module 111 into an audible frequency, and outputs the audio signal. Also, the audio output module 152 outputs an alarm sound according to a display mode of the standby screen. The audio output module 152 processes voice and an audio signals inputted through the microphone 122, and outputs the processed signal.

The memory 160 stores programs and each type of data for controlling an operation of the mobile terminal 100. The memory 160 also stores a program for setting a display function of the standby screen, and information for setting a display function of the standby screen.

The information for setting a display function of the standby screen may include information regarding a method of selecting a broadcast program to be displayed on the standby screen, and information regarding a display method of the broadcast image. The method of selecting a broadcast program is executed by using a preference channel, a broadcast program title, a search word, or a programming time. The broadcast image may be displayed in a still image mode and in a moving image mode.

The memory 160 may temporarily store a broadcast image received through the broadcast receiving module 111, or a broadcast image displayed on the standby screen of the mobile terminal 100 under control of the controller 180.

The controller 180 controls operation of the mobile terminal, and operation relevant to a broadcast viewing mode. The controller 180 also provides a setting menu or a relevant function so that a user can set a display function of the standby screen. The controller 180 searches a broadcast program based on at least one of a preference channel, a broadcast program title, a specific search word, and a broadcast time each set by the user.

When the current mode of the mobile terminal 100 is converted into a standby mode, the controller 180 checks whether the searched broadcast program is being broadcast. If the searched broadcast program is being broadcast, the controller 180 controls the display 151 so that a broadcast image of the broadcast program can be displayed on the standby screen of the mobile terminal. The broadcast image may be a still image or a moving image.

The controller 180 captures the broadcast image into a still image or a moving image based on the information for setting a display function of the standby screen. Then, the controller 180 stores the captured image in the memory 160. The controller 180 selects a broadcast program with a certain time period, and captures a broadcast image of the broadcast program to display on the standby screen, which is repeatedly performed.

When the searched broadcast program is not currently being broadcast, the controller 180 outputs a general standby screen on the display 151. The general standby screen includes a photo, a picture, a moving image, or program content provided from the mobile terminal. While the general standby screen is displayed on the display 151, an indicator for informing that a display function of the standby screen may be displayed on the mobile terminal 100. The indicator may be implemented as an icon, an image, or data content.

The controller 180 controls a still image or a moving image of the broadcast image to be displayed on the standby screen according to a display mode of the broadcast image. When a moving image is to be displayed on the standby screen, the controller 180 may implement a screen saver function applied to a monitor of a computer for displaying only an image without outputting sound.

When a broadcast image is displayed on the standby screen, if a user's input for a broadcast receiving mode is performed, the controller 180 displays the broadcast image on the display 151 wherein the user can view a broadcast program corresponding to the broadcast image The user's input may include one of an input through a specific button on a key pad of the mobile terminal, an input through a button additionally mounted on a side surface of the mobile terminal, an input through a short key for a broadcast viewing, and an input through a selection for a specific menu.

While the user views a broadcast program on the mobile terminal, if a certain menu key is inputted, the currently viewed channel or broadcast program can be set as a broadcast image to be displayed on the standby screen. Accordingly, the user can conveniently set a display function of the standby screen while viewing a broadcast program.

The operation of the mobile terminal for displaying a broadcast image onto a standby screen will be explained below.

The controller 180 stores broadcast image setting information in the memory 160. The information includes information regarding a method of displaying a broadcast image on the standby screen, and information regarding a method of selecting a broadcast program.

When the current mode of the mobile terminal 100 is converted into a standby mode, the controller 180 receives associated broadcast information from the broadcast receiving module 111. The controller 180 receives a selected broadcast program based on information stored in the memory 160, captures a still image or a moving image according to a set display method, and then stores the captured image in the memory 160. The controller 180 retrieves a broadcast image from the memory 160 to display the retrieved broadcast image on the display 151. While the broadcast image is displayed on the display 151, a user requests a broadcast viewing, and the controller 180 responsively causes a broadcast channel to be displayed on the display 151.

An embodiment of the present invention, a broadcast image received through the broadcast receiving module 111 is stored in the memory 160 and later displayed on the display 151. Alternatively, a broadcast image received through the broadcast receiving module 111 may not be stored in the memory 160, but instead is displayed on the display 151 in real time.

FIG. 5 is a flowchart illustrating a method of displaying a broadcast image on a standby screen of the mobile terminal according to one embodiment of the present invention.

Referring to FIG. 5, the controller 180 of the mobile terminal enters a standby screen setting mode by displaying a menu which permits setting of a display function of a standby screen (S101). The controller 180 receives associated broadcast information (EPG) through the broadcast receiving module 111, and stores the EPG in the memory 160.

Then, the controller 180 receives information regarding the display function of the standby screen through the user input unit 130, and sets the display function of the standby screen (S103). The information for setting a display function of the standby screen includes but is not limited to information regarding a method of selecting a broadcast program to be displayed on the standby screen, and information regarding a method of displaying a broadcast image. The method of selecting a broadcast program includes a method of using a preference channel, a broadcast program title, a search word, and a specific time. The broadcast image may be displayed in a still image mode or in a moving image mode (e.g., video).

After the display function of the standby screen has been set, when the current status of the mobile terminal is converted into a standby mode (S105), the controller 180 operates the broadcast receiving module 111 to set a mode for receiving a broadcast signal (S107).

Once the broadcast receiving mode is set, the controller 180 searches a broadcast program according to a method of selecting a broadcast program included in the set information (S109). For example, when a user enters a broadcast program title by the method of selecting a broadcast program, and enters 'CNN news' as a title of a broadcast program to be searched, the controller 180 checks whether a broadcast program identical to the 'CNN news' exists by searching associated broadcast information stored in the memory 160.

Once the broadcast program is searched, the controller 180 checks whether the searched broadcast program is currently being broadcast (S111). If the searched broadcast program is currently being broadcast, the controller 180 displays a broadcast image received through the broadcast receiving module 111 corresponding to the searched broadcast program on the display 151 by the displaying mode of the set information (S113). While the broadcast image is displayed on the display 151, when a certain ending button is inputted, the controller 180 controls the display 151 so that information such as a broadcast program title, a broadcast channel, and a broadcast time of the current broadcast image can be displayed on the standby screen.

For example, when the displaying mode is set as a still image mode, the controller 180 captures a broadcast image of the searched broadcast program to store in the memory 160. Furthermore, when the displaying mode is set as a moving image mode, the controller 180 records a broadcast image of the searched broadcast program for a certain time to store in the memory 160.

Next, the controller 180 reads the broadcast image stored in the memory 160 to display on the display 151. The controller 180 stops operation of the broadcast receiving module 111, and repeatedly performs the steps S101 to S113 after a certain time lapses.

On the contrary, if the searched broadcast program is not currently being broadcast as a result of the program check in step S111, the controller 180 displays a general standby screen set to display an image, a moving image, a photo, or program content, on the display 151 (S115). The controller 180 controls the display 151 to display an indicator such as an icon for informing that the display function of the standby screen has been set. As an example, when a searched broadcast program is not being currently broadcast, general content that is not a broadcast image is displayed on the standby screen, and a set status of the display function of the standby screen is displayed by using an indicator, such as an icon. Accordingly, a user can check whether the display function of the standby screen has been set.

FIGS. 6A-6E illustrate standby screens for setting a display function according to an embodiment of the present invention.

Figure 6A:
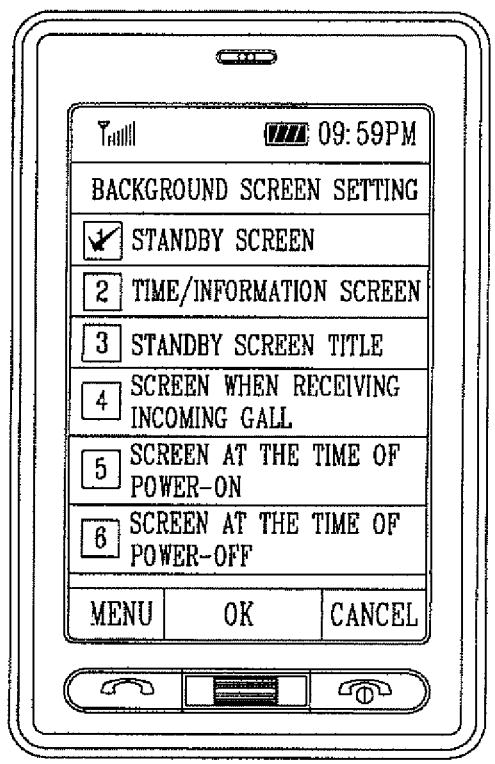
FIGS. 6A-6E illustrate standby screens for setting a display function according to an embodiment of the present invention.

When a menu for setting a background screen is selected by a user, the controller 180 outputs a screen for setting a background screen setting on the display 151 (FIG. 6A). When 'standby screen' is selected, the controller 180 enters a standby screen setting mode. The display 151 then outputs a screen for setting a standby screen.

Figure 6B:
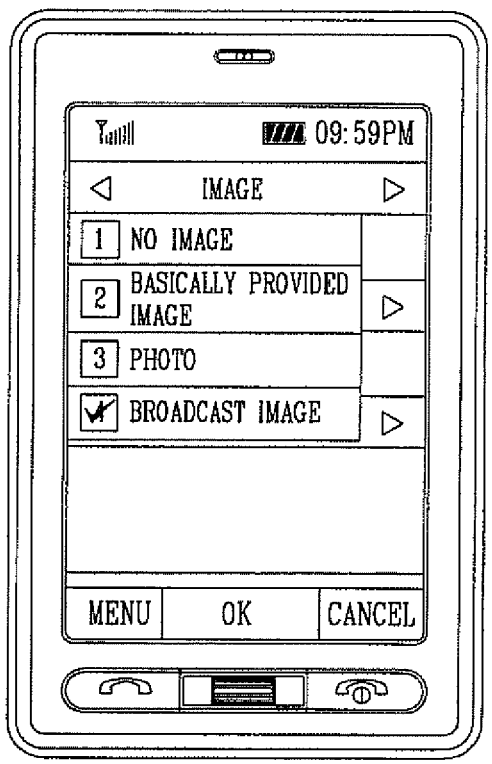

In the standby screen setting mode, the controller 180 identifies an image to be displayed on the standby screen from the user input unit 130. The image to be displayed on the standby screen may include one of a basic image, content, photo, moving image, and broadcast image provided from the mobile terminal (FIG. 6B).

Figure 6C:
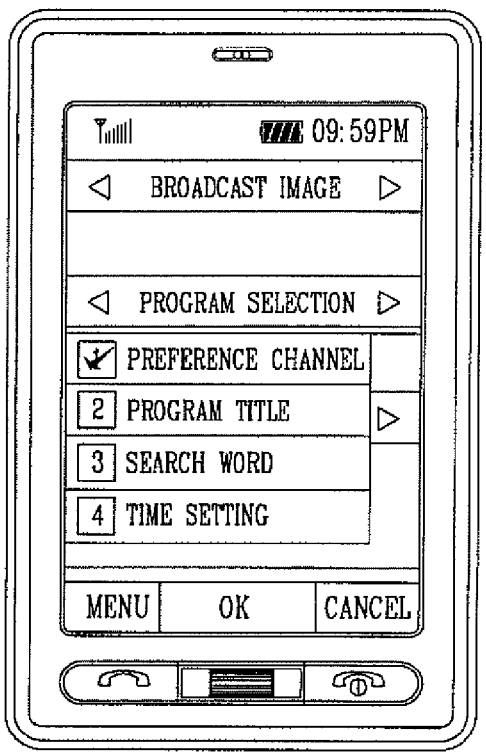

As illustrated in FIG. 6C, a broadcast image is selected as an image to be displayed on the standby screen, the controller 180 receives input relating to a broadcast program to be displayed on the standby screen. The method of selecting a broadcast program may include using a preference channel, broadcast program title, search word, and specific time. When the method of selecting a broadcast program is executed based on a preference channel, the controller 180 sets the most frequently viewed broadcast channel based on a user's viewing frequency for each broadcast channel stored in the memory 160. The preference channel may also be a channel set by a user.

When the method of selecting a broadcast program is executed based on a broadcast program title, the controller 180 receives a user's desired broadcast program title through the user input unit 130 to store in the memory 160.

When the method of selecting a broadcast program is executed based on a search word, the controller 180 receives a specific word through the user input unit 130 to store in the memory 160.

When the method of selecting a broadcast program is executed based on a specific time, the controller 180 receives the specific broadcast time through the user input unit 130 to store in the memory 160.

Once the method of selecting a broadcast program has been set, the controller 180 receives a mode for displaying a broadcast image through the user input unit 130.

Figure 6D:
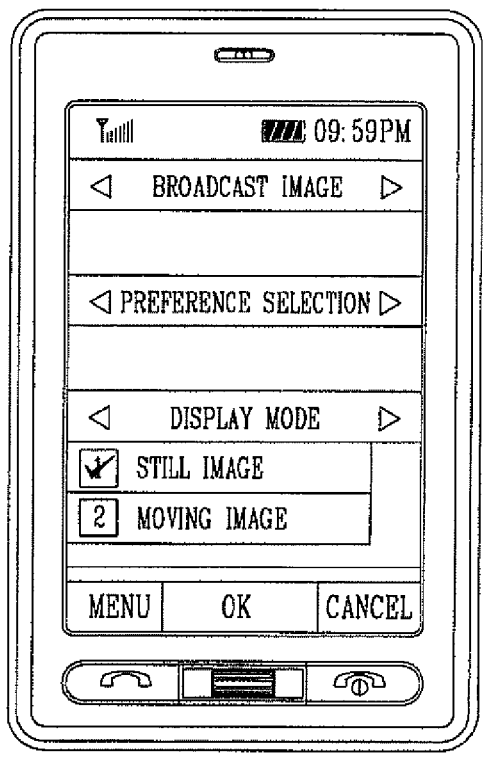

The mode for displaying a broadcast image includes a still image mode for displaying a broadcast image received through the broadcast receiving module 111 by capturing into a still image, and a moving image mode for displaying a broadcast image by recording for a certain time (FIG. 6D).

Specifically, when the mode for displaying a broadcast image is set as a still image mode, the controller 180 captures a broadcast image inputted through the broadcast receiving module 111 into a still image with a certain time period, and then displays the still image.

On the contrary, when the mode for displaying a broadcast image is set as a moving image mode, the controller 180 records a broadcast image inputted through the broadcast receiving module 111 with a certain time period, and then displays the recorded image on the display 151.

In order to filter an advertisement showing at the end of a broadcasting program, the controller 180 checks an ending time of the broadcast program by using associated broadcast information before storing a broadcast image in the still image mode or in the moving image mode.

If there remains a certain amount of time before the broadcast program ends, as a result of the check, the controller 180 may not perform still image capturing and moving image recording.

Figure 6E:
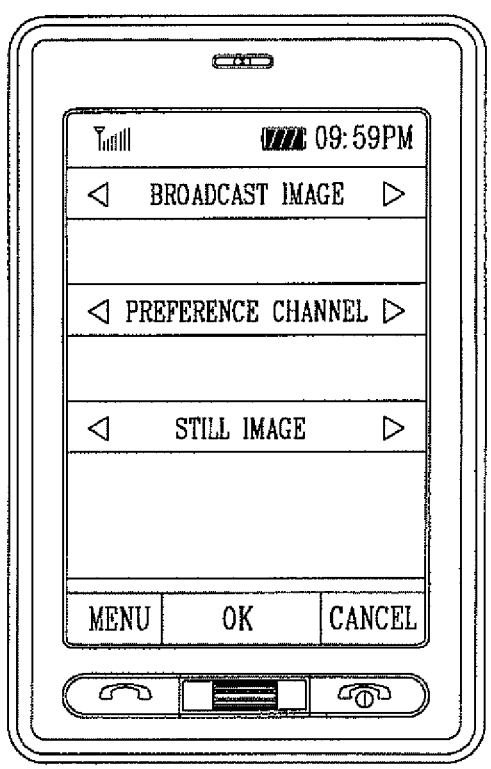

When a user selects an 'OK' button under a status that the set information has been input, as shown in FIG. 6E, the controller 180 stores the set information in the memory 160, and ends a function for setting a background screen.

FIGS. 7A-7D illustrate a standby screen displayed on the mobile terminal according to another embodiment of the present invention.

Once a preference channel and a broadcast time are set by a user as a display function of the standby screen, the controller 180 searches a broadcast channel and a broadcast time from associated broadcast information based on the set information. A broadcast program corresponding to the set information is searched from the associated broadcast information, and the broadcast program is displayed on the display 151 of the mobile terminal 100 as the standby screen.

Figure 7A:
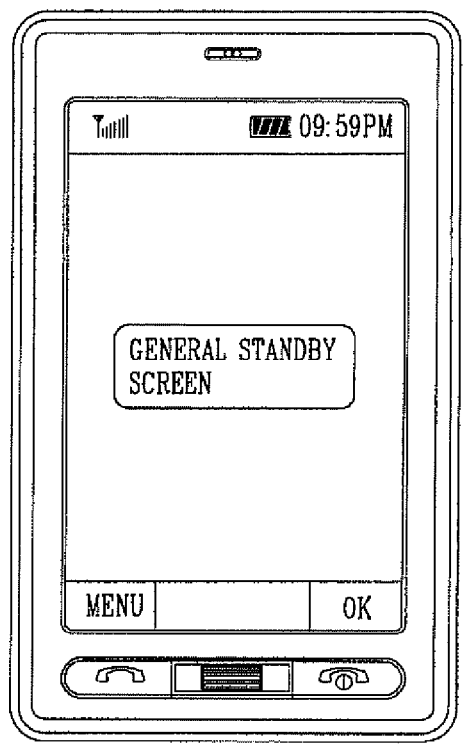
FIGS. 7A-7D illustrate a standby screen displayed on a mobile terminal according to an embodiment of the present invention.
Figure 7B:
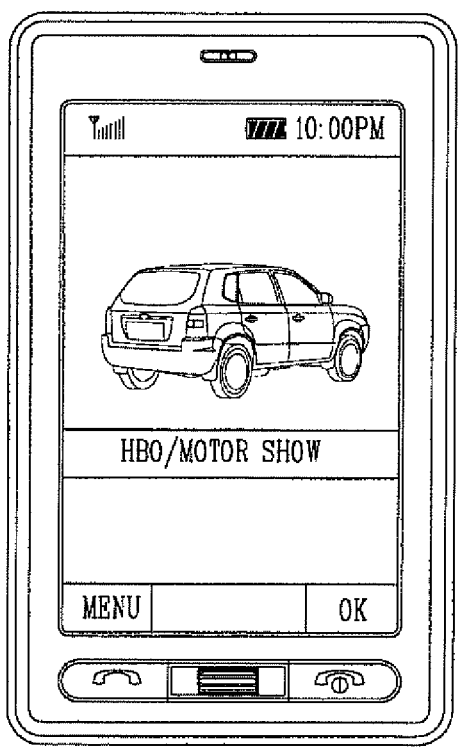

For example, assuming that a broadcast channel 'HBO' and a broadcast time of 10:00 PM are selected by a user in a process for setting a display function of the standby screen. As illustrated in FIG. 7A, when the current time is 9:59 PM prior to the set broadcast time, a general standby screen is displayed on the display 151 of the mobile terminal 100. However, at 10:00 PM, a set broadcast image of a broadcast channel is displayed on the display 151 as the standby screen (FIG. 7B). Here, information relevant to the broadcast image such as a broadcast channel and a broadcast program title may be displayed on the display 151.

Figure 7C:
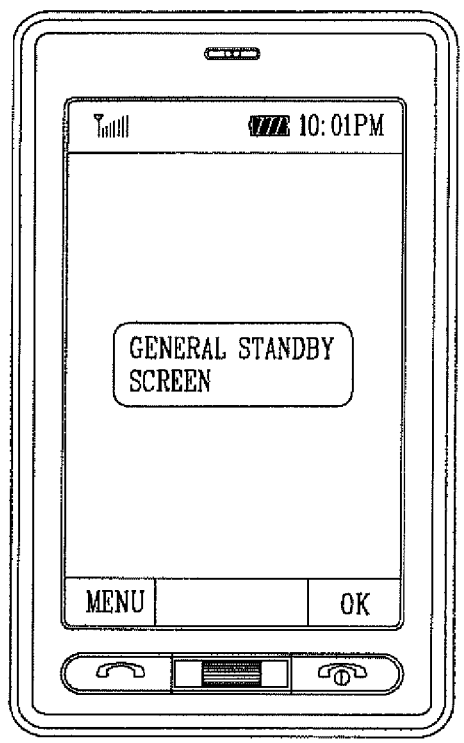
Figure 7D:
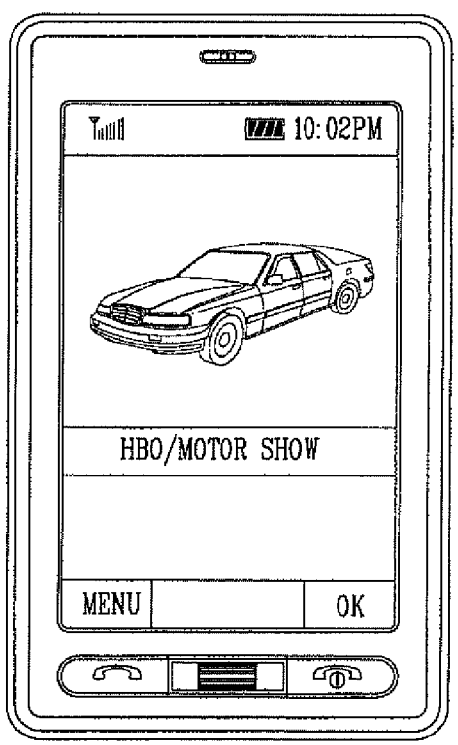

As illustrated in FIG. 7C, when the broadcast image is displayed for a certain time as a standby screen, the mobile terminal 100 returns to the general standby screen. As illustrated in FIG. 7D, a broadcast image of the broadcast channel is captured to be displayed on the display 151 again for a certain time as a standby screen. Referring to FIGS. 7B and 7D, the first broadcast image is displayed at 10:00 PM and the second broadcast image is displayed at 10:02 PM. Accordingly, in this example, the time interval taken to update the broadcast image displayed on the standby screen is two minutes. Here, the time interval for updating the broadcast image may be set by a user.

Figure 8A:
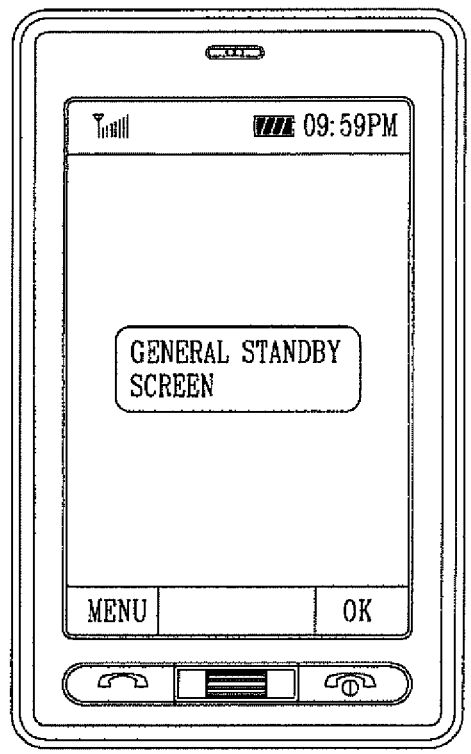
FIGS. 8A-8C illustrate a standby screen displayed on a mobile terminal according to another embodiment of the present invention.
Figure 8B:
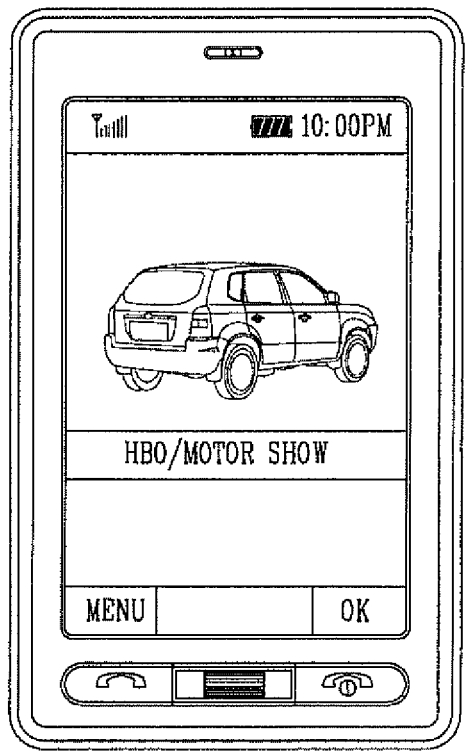
Figure 8C:
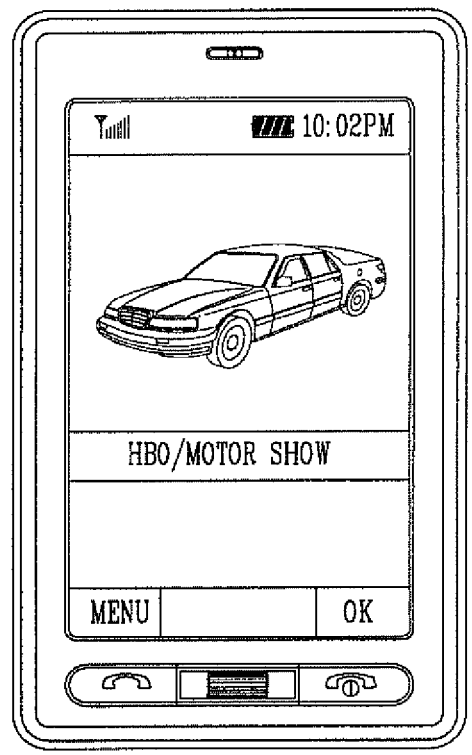

FIGS. 8A-8C illustrate a standby screen displayed on a mobile terminal according to another embodiment of the present invention.

In contrast to the standby screens illustrated in FIGS. 7A-7D, the standby screen on which the broadcast image is displayed is not updated to a general standby screen. That is, a broadcast image of a broadcast program set by a user in a mode for setting a display function of the standby screen with a constant time period is displayed on the standby screen. Referring to FIGS. 8B-8C, when a user sets a broadcast image display mode as a still image mode (FIG. 8B), the standby screen of the mobile terminal 100 is updated as a currently viewed broadcast image is captured within a certain time period (FIG. 8C).

In one embodiment of the present invention, a display function of the standby screen is set by a user's menu setting. However, the display function of the standby screen may be set while a broadcast program is viewed.

For example, when a command for setting the standby screen is inputted from the user input unit 130 while a broadcast program is viewed, the controller 180 displays a setting screen for setting the standby screen. When a broadcast image display mode is selected from the displayed setting screen, the controller 180 sets the display function of the standby screen based on the currently viewed broadcast program and the selected broadcast image display mode.

When the current display mode of the mobile terminal 100 is converted into a standby mode, the controller 180 checks whether the set broadcast program is being broadcast. If the set broadcast program is being broadcast, a broadcast image of the set broadcast program is displayed on the display 151.

In the aforementioned embodiment, the standby screen was set by using the currently viewed broadcast program. However, the standby screen may be set by using another broadcast program.

In the mobile terminal according to various embodiments of the present invention, a user can conveniently set a display function of the standby screen while a broadcast program is viewed. A number of benefits are possible, some of which are as follows.

First, a broadcast image is provided on the standby screen of the mobile terminal, thereby allowing a user to precisely recognize information of a corresponding broadcast program.

Second, while a currently-viewed broadcast image according to a desired channel is displayed on the standby screen, if the current broadcast image is required to be viewed, a broadcast viewing mode for receiving a broadcast program of a corresponding channel is implemented. Accordingly, a broadcast program can be immediately viewed, and thus a user's convenience is enhanced.

Third, the current broadcast screen is displayed on the standby screen in correspondence to a user's preference channel or a broadcast time of a user's preference broadcast program. Accordingly, the user can recognize their desired broadcast program to be viewed whenever using the mobile terminal.

Fourth, a broadcast image of a broadcast program corresponding to a user's desired broadcast information is displayed on the standby screen by periodically turning on/off the broadcast receiving module. Accordingly, the user can easily check the broadcast information, and power consumption may be reduced.

Fifth, a medium for recording a program can be implemented as a code that can be read by a computer. The medium that can be read by a computer includes all kinds of recording devices for storing data such as a ROM, a RAM, a CD-ROM, a magnetic tape, a floppy disk, and an optical data storing device. The medium can also be implemented as a carrier wave, e.g., a data transmission through the Internet. The computer may include the controller 180 of the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying a standby screen at a mobile terminal, the method comprising:
    initiating a broadcast receiving mode for receiving a broadcast signal via a broadcasting receiving module of the mobile terminal when the mobile terminal is converted into a standby mode;
    determining whether a preselected broadcast program is currently being broadcast by searching associated broadcast information stored in a memory of the mobile terminal;
    displaying broadcast images received through the broadcast receiving module in real time without outputting sound as a first standby screen if the preselected broadcast program is currently being broadcast, and displaying at least one image stored in the memory as a second standby screen if the preselected broadcast program is not currently being broadcast; and
    outputting the broadcast images of the preselected broadcast program currently being broadcast with sound when a broadcast viewing is requested.

2. The method of claim 1, wherein the preselected broadcast program is selected using at least a channel, a program title, a search word, or a broadcast time.

3. The method of claim 1, wherein determining whether the preselected broadcast program is currently being broadcast comprises comparing at least one search identifier with the associated broadcast information.

4. The method of claim 3, further comprising:
    displaying at least part of the associated broadcast information corresponding to the preselected broadcast program on the first standby screen, the at least part of the associated broadcast information comprising at least a broadcast channel or a broadcast program title associated with the preselected broadcast program.

5. The method of claim 4, wherein the at least broadcast channel or broadcast program title is displayed on the first standby screen when an input is received for displaying the at least broadcast channel or broadcast program title while the first standby screen is displayed.

6. The method of claim 1, further comprising:
    selecting a presently viewing multimedia broadcast program as a source of the first standby screen such that at least one image of the presently viewing multimedia broadcast program is displayed when the mobile terminal is converted into the standby mode.

7. The method of claim 1, further comprising:
    displaying, on the first standby screen, an indicator representing that the first standby screen is set to display the broadcast images of the preselected broadcast program, the indicator comprising an icon.

8. A mobile terminal, comprising:
    a broadcast receiving module configured to receive a broadcast signal;
    a user input unit configured to receive user input;
    a memory configured to store data;
    a display configured to display images; and
    a controller configured to:
        initiate a broadcast receiving mode for receiving the broadcast signal via the broadcasting receiving module when the mobile terminal is converted into a standby mode:
        determine whether a preselected broadcast program is currently being broadcast by searching associated broadcast information stored in the memory;
        cause the display to display broadcast images received through the broadcast receiving module in real time without outputting sound as a first standby screen if the preselected broadcast program is currently being broadcast, and to display at least one image stored in the memory as a second standby screen if the preselected broadcast program is not currently being broadcast; and
        and
        cause output of the broadcast images of the preselected broadcast program currently being broadcast and received via the broadcast receiving module with sound when a broadcast viewing is requested.

9. The mobile terminal of claim 8, wherein the preselected broadcast program is selected using at least a channel, a program title, a search word or a broadcast time.

10. The mobile terminal of claim 8, wherein the controller is further configured to cause the display to display a menu option for selecting a presently viewing multimedia broadcast program as a source of the first standby screen such that at least one image of the presently viewing multimedia broadcast program is displayed when the mobile terminal enters the standby mode.

11. The mobile terminal of claim 8, wherein the controller is further configured to cause the display to display, on the first standby screen, at least a broadcast channel or a broadcast program title associated with the preselected broadcast program.

12. The mobile terminal of claim 8, wherein the controller is further configured to cause the display to display an indicator on the first standby screen, the indicator representing that the first standby screen is set to display the broadcast images of the preselected broadcast program, the indicator comprising an icon.

* * * * *